US012536612B2

(12) United States Patent
Li

(10) Patent No.: US 12,536,612 B2
(45) Date of Patent: Jan. 27, 2026

(54) UPSCALING BASED ON MULTI-SAMPLE ANTI-ALIASING (MSAA)

(71) Applicant: Sharp Growth (Canada) Limited, Toronto (CA)

(72) Inventor: Bo Li, Brossard (CA)

(73) Assignee: Sharp Growth (Canada) Limited, Toronto (CA)

( * ) Notice: Subject to any disclaimer, the term of this patent is extended or adjusted under 35 U.S.C. 154(b) by 159 days.

(21) Appl. No.: 18/386,141

(22) Filed: Nov. 1, 2023

(65) Prior Publication Data

US 2025/0139739 A1 May 1, 2025

(51) Int. Cl.
  *G06T 3/4053* (2024.01)
  *G06T 1/60* (2006.01)
  *G06T 11/20* (2006.01)

(52) U.S. Cl.
  CPC .............. *G06T 3/4053* (2013.01); *G06T 1/60* (2013.01); *G06T 11/203* (2013.01)

(58) Field of Classification Search
  CPC ........ G06T 3/4053; G06T 1/60; G06T 11/203
  See application file for complete search history.

(56) References Cited

U.S. PATENT DOCUMENTS

| 2013/0293565 | A1* | 11/2013 | Arvo | ......................... | G06T 9/00 345/589 |
| 2016/0042549 | A1* | 2/2016 | Li | ............................. | G06T 1/20 345/426 |
| 2017/0206626 | A1* | 7/2017 | Fainstain | .............. | G06T 15/005 |
| 2023/0153958 | A1* | 5/2023 | Lung | ........................ | G06T 5/70 382/100 |
| 2023/0206394 | A1* | 6/2023 | Janis | ..................... | G06T 3/4053 345/595 |

OTHER PUBLICATIONS

Luo, D.; Zhang, J. The #-Filter Anti-Aliasing Based on Sub-Pixel Continuous Edges. Mathematics 2020, 8, 1655. https://doi.org/10.3390/math8101655 (Year: 2020).*

(Continued)

*Primary Examiner* — Kee M Tung
*Assistant Examiner* — Xiaoming We
(74) *Attorney, Agent, or Firm* — ArentFox Schiff LLP

(57) ABSTRACT

Processing circuitry (e.g., GPU) obtains a first MSAA intermediate buffer from a rendering of a first image, the first MSAA intermediate buffer includes a plurality of subsamples for each pixel of the first image. The processing circuitry determines, for a first pixel of the first image, a first surrounding subsample pattern based on first subsamples in a surrounding region of the first pixel. Further, the processing circuitry obtains, based on the first surrounding subsample pattern, a first blending weight vector for a first location among a plurality of locations that define output pixel locations within the first pixel for upscaling the first pixel to a plurality of output pixels in an upscaled image of higher resolution than the first image. The first blending weight vector includes first blending weights respectively for first candidate subsamples associated with the first pixel. The processing circuitry generates the upscaled image accordingly.

18 Claims, 10 Drawing Sheets

(56) References Cited

OTHER PUBLICATIONS

4-Rook Antialiasing (RGSS), https://blog.demofox.org/2015/04/23/4-rook-antialiasing-rgss/ (Year: 2015).*
International Search Report and Written Opinion received for PCT Patent Application No. PCT/IB2024/055226, mailed on Oct. 3, 2024, 9 pages.
Yang et al., "A survey of temporal antialiasing techniques", Computer graphics forum, vol. 39. No. 2, 2020, pp. 607-621.

* cited by examiner

FIG. 4

| SUBSAMPLE DIFFERENCE PATTERN | | | | | | | | MISSING SUBSAMPLES | CANDIDATE SUBSAMPLES | | | | | | | |
|---|---|---|---|---|---|---|---|---|---|---|---|---|---|---|---|---|
| | | | | | | | | | a | b | c | d | e | f | g | h |
| | | | | | | | | | 1 | 0 | 9 | 0 | 0 | 0 | 0 | 0 |
| 0 | 0 | 0 | 0 | 0 | 0 | 0 | 0 | 1 | | | | | | | | |
| 0 | 0 | 0 | 0 | 0 | 0 | 0 | 0 | 2 | | | | | | | | |
| 0 | 0 | 0 | 0 | 0 | 0 | 0 | 0 | 3 | | | | | | | | |
| 0 | 0 | 0 | 0 | 0 | 0 | 0 | 0 | 4 | | | | | | | | |
| 0 | 0 | 0 | 0 | 0 | 0 | 0 | 0 | 5 | | | | | | | | |
| 0 | 0 | 0 | 0 | 0 | 0 | 0 | 0 | 6 | | | | | | | | |
| 0 | 0 | 0 | 0 | 0 | 0 | 0 | 0 | 7 | | | | | | | | |
| 0 | 0 | 0 | 0 | 0 | 0 | 0 | 0 | 8 | | | | | | | | |
| 0 | 0 | 0 | 0 | 0 | 0 | 0 | 0 | 9 | | | | | | | | |
| 0 | 0 | 0 | 0 | 0 | 0 | 0 | 0 | 10 | | | | | | | | |
| 0 | 0 | 0 | 0 | 0 | 0 | 0 | 0 | 11 | | | | | | | | |
| 0 | 0 | 0 | 0 | 0 | 0 | 0 | 0 | 12 | | | | | | | | |
| 1 | 0 | 0 | 0 | 0 | 0 | 0 | 0 | 1 | | | | | | | | |
| 1 | 0 | 0 | 0 | 0 | 0 | 0 | 0 | 2 | | | | | | | | |
| 1 | 0 | 0 | 0 | 0 | 0 | 0 | 0 | 3 | | | | | | | | |
| 1 | 0 | 0 | 0 | 0 | 0 | 0 | 0 | 4 | | | | | | | | |

400

UPSCALING BASED ON MULTI-SAMPLE ANTI-ALIASING (MSAA)

TECHNICAL FIELD

The present disclosure describes embodiments generally related to graphics processing, and more particularly, related to rendering technology in the graphics processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In graphics processing, rendering may refer to a process of generating an image from a three-dimensional (3D) model or a two-dimensional (2D) model. In some examples, a computing system can include a graphics processing unit (GPU) for accelerating rendering, and a rendering process in a computing system may be referred to as a graphics pipeline. The graphics pipeline can include various operations, such as vertex shading operations, fragment shading operations and the like.

SUMMARY

Aspects of the disclosure provide methods and apparatuses for upscaling based on multi-sample anti-aliasing (MSAA). In some example, processing circuitry (e.g., GPU) obtains a first multi-sample anti-aliasing (MSAA) intermediate buffer from a rendering of a first image, the first MSAA intermediate buffer includes a plurality of subsamples for each pixel of the first image. The processing circuitry determines, for a first pixel of the first image, a first surrounding subsample pattern based on first subsamples in a surrounding region of the first pixel. Further, the processing circuitry obtains, based on the first surrounding subsample pattern, a first blending weight vector for a first location among a plurality of locations that define the output pixel locations within the first pixel for upscaling the first pixel to a plurality of output pixels in an upscaled image of higher resolution than the first image. The first blending weight vector includes first blending weights respectively for first candidate subsamples associated with the first pixel. The processing circuitry generates the upscaled image corresponding to the first image, a value for a first output pixel of the upscaled image at the first location within the first pixel of the first image is calculated as a weighted sum of the first candidate subsamples according to the first blending weights.

In some examples, the rendering of the first image generates for a pixel of the first image, a plurality of subsamples that have a rotated grip supersampling (RGSS) pattern. In an example, the rendering of the image generates four subsamples of 4×RGSS pattern for the pixel of the first image.

In some examples, the first subsamples in the surrounding region of the first pixel comprises a plurality of subsamples in the first pixel. In an example, the first subsamples in the surrounding region of the first pixel includes one or more subsamples in one or more adjacent pixels of the first pixel.

In some examples, the first surrounding subsample pattern is a subsample difference pattern. The processing circuitry determines a difference between two subsamples in the first subsamples and determines a bit in the first surrounding subsample pattern based on the difference. In an example, the difference is at least one of a color difference, a luminance difference, and a depth difference.

In some examples, the first subsamples that are used to generate the first surrounding subsample pattern are of a same set of subsamples as the first candidate subsamples.

In some examples, the first subsamples that are used to generate the first surrounding subsample pattern include the first candidate subsamples.

In some examples, the first candidate subsamples include the first subsamples that are used to generate the first surrounding subsample pattern.

In some examples, the processing circuitry determines an index to a lookup table according to the first surrounding subsample pattern, the lookup table includes a set of blending weight vectors that are indexed according to surrounding subsample patterns.

In some examples, the processing circuitry pre-trains the set of blending weight vectors for the surrounding subsample patterns by using at least a reference image of a resolution that is equal to or higher than the upscaled image. For example, the processing circuitry obtains a second MSAA intermediate buffer from a rendering of a second image having a same camera setting as the reference image, the second image has a same resolution as the first image. the processing circuitry collects votes of candidate subsamples for a surrounding subsample pattern based on the second MSAA intermediate buffer and the reference image, and determines blending weights in a blending weight vector associated with the surrounding subsample pattern according to the votes of the candidate subsamples. In an example, for a location in a pixel of the second image that has a corresponding pixel in the reference image, the processing circuitry determines, from the candidate subsamples, a first candidate subsample that has a least error to the corresponding pixel in the reference image and adds a vote to the first candidate subsample.

Aspects of the disclosure also provide a non-transitory computer-readable medium storing instructions which when executed by a computer cause the computer to perform the method for upscaling based on multi-sample anti-aliasing (MSAA).

BRIEF DESCRIPTION OF THE DRAWINGS

Further features, the nature, and various advantages of the disclosed subject matter will be more apparent from the following detailed description and the accompanying drawings in which:

FIG. 4 shows a diagram illustrating votes of best marching candidates in an example.

DETAILED DESCRIPTION OF EMBODIMENTS

Figure 1:
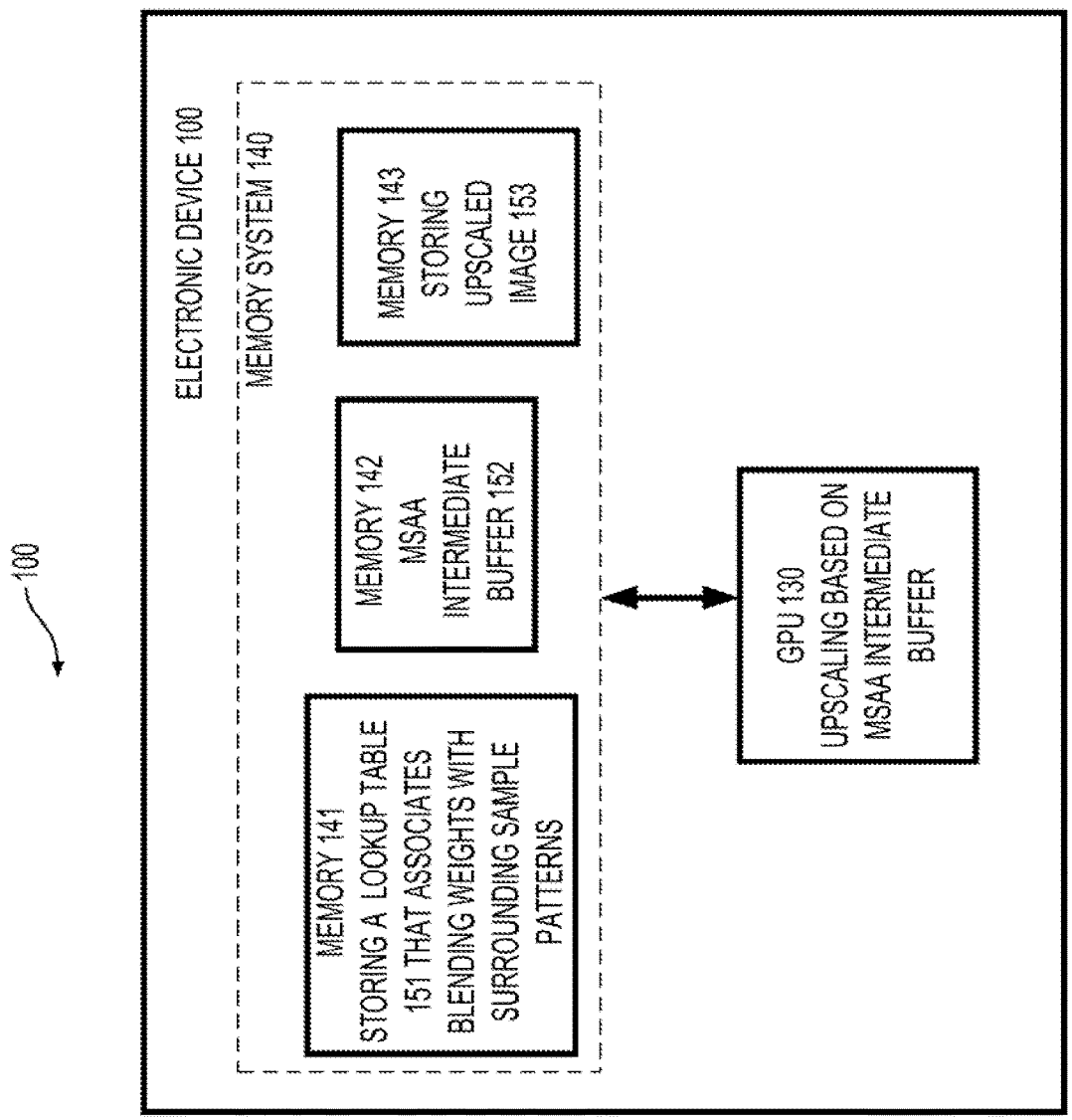
FIG. 1 shows a block diagram of an electronic device according to some embodiments of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, these concepts may be practiced without these specific details.

In the present disclosure, some technical terms are used with the following definitions.

FSAA denotes full-scene anti-aliasing that works conceptually by simply rendering a scene at a higher resolution, and then down-sampling to a lower-resolution output.

MSAA denotes multi-sample anti-aliasing, and refers to a specific optimization of supersampling (or super-sampling). For example, a renderer evaluates the fragment program once per pixel, and supersamples the depth and stencil values. The term multisampling (or multi-sampling) refers to any special case of supersampling where some components of the final image are not fully supersampled. In an example, for a fully N×N supersampling, a pixel is sampled at N×N points within the pixel, the N×N points form a grid and are spaced at axis-aligned interval, N is a positive integer; and for a N× multisampling, the number of sampling points in the pixel is N, the N points are sparsely distributed, not every grid has a sampling point.

RGSS denotes rotated grid supersampling, and is a technique used in computer graphics and rendering to improve the quality of images produced by rendering algorithms, particularly in the context of anti-aliasing. Anti-aliasing is a process that reduces the jagged or "jagged" edges (aliasing artifacts) that can occur in computer-generated images, especially when rendering diagonal lines or curves. In a regular grid-based supersampling, multiple samples are taken at regular axis-aligned intervals within each pixel to estimate the color and other properties of the pixel. The regular grid-based supersampling helps reduce aliasing artifacts, but may not be as effective when dealing with rotated or diagonal lines. Rotated grid supersampling addresses this issue by using a rotated grid pattern for sampling.

Super resolution (SR) is a technique in image processing and computer vision used to enhance the resolution or level of detail in an image or video beyond the original quality. The goal of super resolution is to generate a higher-resolution version of an image or video from one or more lower-resolution source images. This technique is particularly useful in applications where higher-quality images or videos are required, such as medical imaging, surveillance, satellite imagery, and even improving the quality of old or low-resolution photographs.

Single-image super resolution (SISR) is to increase the resolution of a single low-resolution image. SISR can be achieved by learning a mapping function from low-resolution to high-resolution images using techniques like deep learning, such as convolutional neural networks (CNNs).

Multi-image super resolution (MISR) techniques use multiple low-resolution images of the same scene or object taken from slightly different viewpoints or with small motion differences to generate a higher-resolution image. MISR leverages information across multiple images to improve the resolution.

Fragment refers to a collection of values produced by a rasterizer. Each fragment represents a sample-sized segment of a rasterized primitive. In some examples, the size covered by a fragment is related to a pixel area. In some examples, rasterization can produce multiple fragments per-pixel from a same triangle primitive, depending on various multisampling parameters and render state. In some examples, at least one fragment is produced for every pixel area covered by a primitive that is rasterized. In some examples, a fragment corresponds to a base unit generated by rasterization, and may include a set of colors and a single depth value. In an example, a fragment corresponds to a pixel. In another example, a fragment corresponds to a sample when multiple samples are generated in an area of a pixel. For clarity and ease of description, when multiple samples are generated in the area of a pixel, the samples are referred to as subsamples for sub-pixel samples and a fragment corresponds to a subsample.

Alpha-test refers to, in rendering, a technique used to determine whether a pixel in a rendered image should be displayed or not based on its alpha (transparency) value. Alpha-test is primarily used in computer graphics and 2D or 3D rendering to handle transparency in textures or images.

According to an aspect of the present disclosure, rendering high resolution image requires a lot of computation resources, memory bandwidth and storage spaces. On low power devices, such as mobile phones, tablets, portable game consoles, and the like, high-resolution image output is especially challenging. Some aspects of the disclosure provide an efficient upscaling technique that outputs high-resolution image based on low-resolution intermediate image.

Generally, resolution upscaling methods can be complicated, require special hardware or high run-time computation resources to produce high-quality result, which may not be suitable to run on low power devices. On the other hand, simple algorithms with low computation cost often failed in terms of output quality.

In a first related example, a special acceleration hardware that is referred to as tensor cores can operate on trained neural networks and multi-image super resolution (MISR) to obtain high quality results. While the quality is great, proprietary hardware is required to accelerate the algorithm, hence not applicable to general graphics acceleration hardware. Furthermore, high-end desktop processor is required to obtain good performance.

In a second related example, an open-source super resolution solution does not require proprietary hardware, and can work based on single-image super resolution (SISR) or multi-image super resolution (MISR) mode. The open-source super resolution solution still needs to work on high-performance desktop GPUs, the complexity is still very high on low-power handheld devices. Furthermore, the SISR part is based on conventional low-resolution images with conventional image processing algorithms such as sharpening filters. As a result, in the second related example, the open-source super resolution solution has no knowledge of high-resolution geometry information, reconstruction of proper high-resolution edges from jaggy low-resolution inputs may fail.

Some aspects of the disclosure provide techniques that use intermediate results of multi-sample anti-aliasing (MSAA) for single-image super resolution upscaling. The techniques are referred to as MSAA based upscaling.

Generally, GPU hardware units, even the GPUs in low-power handheld devices, are configured to support multi-sample anti-aliasing (MSAA). For example, when the GPU renders an output image, MSAA generates micro-geometry information, such as geometry information of subpixels of the output image, as intermediate results, and can generate pixels of the output image based on the intermediate results. The geometry information of subpixels is used for anti-aliasing in the output image.

Some aspects of the disclosure can utilize the extra micro-geometry information in the intermediate results of the MSAA. The micro-geometry information can be used with a set of pre-trained data (e.g., a set of pre-trained blending weight vectors, each pre-trained blending weight vector includes blending weights that are pretrained for certain geometry pattern) that is trained using high-quality reference image(s), to obtain high resolution outputs, such as an image of higher resolution. Since expensive training process is performed prior to the run-time loop, the run-time computation complexity is minimal and performance is high, even on low-power devices.

FIG. 1 shows a block diagram of an electronic device (100) according to some embodiments of the disclosure. The electronic device (100) can include a graphics processing unit (GPU) (130) that is configured to perform (image resolution) upscaling based on MSAA intermediate results in MSAA intermediate buffer.

The electronic device (100) can be any suitable electronic device, such as a desktop computer, a laptop computer, a smart phone, a gaming device, a wearable device, a portable computing device, a virtual reality headset, and the like. The electronic device (100) can perform any suitable video games or similar real-time rendering applications that may require very high performance super-resolution solution. In some examples, the electronic device (100) may have tight memory and computation budget, but still can be configured to perform the real-time rendering applications that require super-resolution image quality.

The electronic device (100) includes the GPU (130) and a memory system (140). The memory system (140) includes memory spaces that are allocated for various storage purposes. For example, the memory system (140) includes a memory (141) allocated for storing a lookup table (151) of blending weights, a memory (142) allocated for an MSAA intermediate buffer (152), and a memory (143) allocated for storing an upscaled image (153) of upscaled resolution for final output. The memory (141), the memory (142) and the memory (143) can be same type of memory or different types of memory, such as static random access memory (SRAM), dynamic random access memory (DRAM), flash memory, hard drive, solid state drive (SSD), and the like. In some examples, the memory (141), the memory (142) and the memory (143) are integrated on a same chip with the GPU (130). In some examples, the memory (141), the memory (142) and the memory (143) are implemented using off chip memories that are on different chip(s) from the GPU (130). In some examples, a portion of the memory (141), the memory (142) and the memory (143) is on the same chip with the GPU (130), and another portion of the memory (141), the memory (142) and the memory (143) is implemented using off chip memory that are on different chip(s) from the GPU (130).

Generally, a GPU, such as the GPU (130), can perform MSAA for anti-aliasing during rasterization. To perform a regular MSAA, the GPU can sample signals at a spatial rate that generate more details than an intended output image, such as an output image to be displayed at a screen having a screen resolution. For example, when the screen resolution is 800×600, the pixel resolution (pixel counts in two-dimensional space) of the intended output image represented by 800×600, and the GPU can sample, for example edges of primitives and the like, using more samples per pixel. Further, to perform MSAA, the GPU can store the oversampled signals in a buffer that is referred to as MSAA intermediate buffer. For example, the MSAA intermediate buffer can store micro geometry edge information. The GPU can process the oversampled signals, and then down-sample the oversampled signals to the screen resolution, for example, using a reconstruction filter, and the down-sampled signals can be the output image of the regular MSAA, and can be displayed by the screen.

According to some aspects of the disclosure, when the GPU (130) performs the MSAA, the memory (142) is configured as the MSAA intermediate buffer (152) that stores the micro geometry edge information. For example, the MSAA intermediate buffer (152) stores geometry information of multiple samples within a pixel. The GPU (130) can access the memory (142) for the micro-geometry edge information in the MSAA intermediate buffer (152), and can generate the upscaled image (153) that has higher resolution than the output image of the regular MSAA, based on the micro-geometry edge information. The upscaled image (153) can stored in the memory (143).

Specifically, in some examples of MSAA, coverage and occlusion tests can be performed at higher-than-normal resolution, such as two times (2×), four times (4×), eight times (8×), sixteen times (16×), and the like of the screen resolution. In implementation, N sample points are generated within a pixel, where N is the multi-sample rate. The samples within the pixel can be referred to as subsamples or fragments or sub-pixel samples. In some examples, the subsamples can be generated according to a sampling pattern. In some examples, standard multi-sample patterns are defined. The standard multi-sample patterns can include a standard 2 sample pattern (e.g., a pattern for two samples within a pixel), a standard 4 sample pattern (e.g., a pattern for four samples within a pixel), a standard 8 sample pattern (e.g., a pattern for eight samples within a pixel), a standard 16 sample pattern (e.g., a pattern for sixteen samples within a pixel), and the like.

Figure 2:
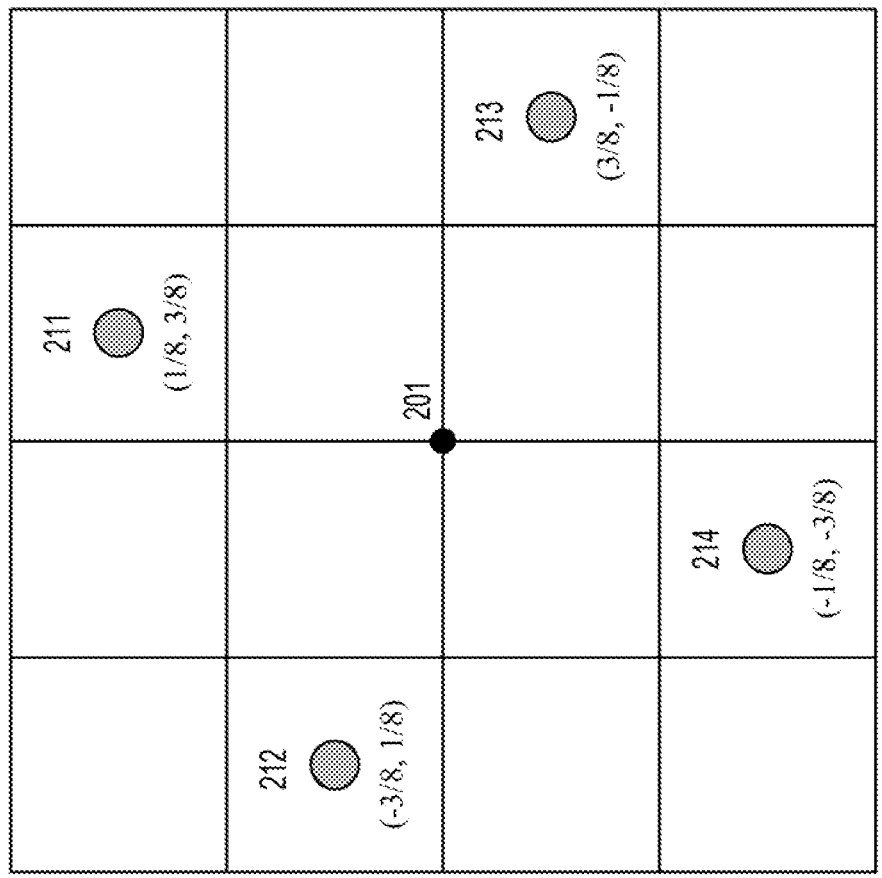
FIG. 2 shows a diagram of a pixel with a sampling pattern in some examples.

FIG. 2 shows a diagram of a pixel (200) with a sampling pattern in some examples. The center of the pixel is shown by (201). In the FIG. 2 example, the sampling pattern includes four sampling points (211)-(214). The pixel (200) is referred to have a size of 1×1, which indicates 1 pixel width and 1 pixel height. When the center (201) has coordinates (0,0), the sampling point (211) has the coordinates (⅛, ⅜) in pixels, the sampling point (212) has the coordinates (−⅜, ⅛) in pixels, the sampling point (213) has the coordinates (⅜, −⅛) in pixels, and the sampling point (214) has the coordinates (−⅛, −⅜) in pixels. The sample pattern in FIG. 2 can be referred to as standard 4 sample pattern, or 4× rotated grid supersampling (RGSS) sampling pattern. For the 4×RGSS sampling pattern, sampling points within a pixel do not share a vertical line or horizontal line with any other sampling point within the pixel. The sampling points of the 4×RGSS sampling pattern, such as the sampling points (211)-(214), can include about the same level of details in the vertical direction and horizontal direction as 4×4 grid based sampling pattern used in rendering with FSAA. The rendering with FSAA requires 16 times of memory space as the rendering without anti-aliasing. In an example, using the 4×RGSS sampling pattern can generate geometry resolution close to 4×4 grid based sampling pattern, and rendering with the 4×RGSS sampling pattern can consume 4 times of memory space as the rendering without the anti-aliasing and can have a reduced number of shading cost than the rendering with FSAA.

In some examples, MSAA is a hardware optimization rendering mode that is supported by 3D graphics accelerators of most GPUs. In the MSAA mode, within a pixel area, a GPU can detect fragments (e.g., subsamples) that shared by the same geometry, and broadcast shaded fragment within a pixel, as that a geometry within a pixel is shaded only once, rather than for each fragments covering the said geometry. In an example, when three of the four subsamples in a pixel is covered (in a coverage) by a first triangle and a fourth subsample in the pixel is covered by a second triangle, a center of the three subsamples can be shaded based on the first triangle, and the shading results can be stored respectively for the three subsamples. The fourth subsample can be shaded based on the second triangle. Thus, in the MSAA mode, shading cost is reduced from rendering with FSAA that performs shading for every subsample.

In some examples, by using the RGSS sampling pattern, MSAA intermediate buffer can actually include much more geometry information than an upscaled regular buffer. For example, for an output image of 800×600 resolution, using the 4×RGSS sampling pattern, the MSAA intermediate buffer has the same memory footprint as a regular 1600× 1200 image, but due to 4×RGSS sampling pattern, the MSAA intermediate buffer actually can provide geometry resolution close to 3200×2400 resolution.

Generally, for the regular MSAA, geometry information of the sampling points (211)-(214) are stored as intermediate image, such as in the MSAA intermediate buffer. For regular MSAA, the sampling points (211)-(214) can be suitably down-sampled to generate one output pixel. Some aspects of the disclosure provide techniques to use the MSAA intermediate buffer to reconstruct higher resolution output image than the intended output image of the regular MSAA. For example, the 4×RGSS sampling pattern in FIG. 2 includes subsamples that are sparse and occupy irregular locations, and can cover four rows and four columns, and can provide geometry information at about the same detail level as 4×4 axis-aligned 2D grid-based sampling pattern. In an example, based on the geometry information of MSAA intermediate buffer for an intended output image of 800×600, some techniques provided by the present disclosure can reconstruct higher resolution output image, such as 1600×1200, 3200×2400 and the like.

According to some aspects of the disclosure, a mapping of the blending weights with surrounding subsample patterns is suitable pre-trained using a data driven approach. In FIG. 1 example, the mapping is stored as the lookup table (151) that associates the blending weight vectors with surrounding subsample patterns for each of a plurality of locations in a pixel of lower resolution. The plurality of locations can correspond to the locations of output pixels of the higher resolution. A blending weight vector corresponding to a surrounding subsample pattern includes blending weights respectively for candidate subsamples in the subsamples buffered in the MSAA intermediate buffer (152). The surrounding subsample pattern is formed based on surrounding subsamples of the pixel. The surrounding subsamples are among the subsamples buffered in the MSAA intermediate buffer. The candidate subsamples can be the same subsamples as the surrounding subsamples or can be different from the surrounding subsamples.

In some examples, during rendering of a higher resolution image than the output image of regular MSAA, the GPU (130) performs the MSAA, the geometry information of subsamples for each pixel of the output image of regular MSAA are buffered in the MSAA intermediate buffer (152). For example, the MSAA intermediate buffer (152) includes geometry information of a plurality of subsamples within a pixel of the output image of the regular MSAA. Further, the lookup table (151) is loaded into the memory (141) that is accessible by the GPU (130). Further, the GPU (130) determines, for a pixel of the regular image, a surrounding subsample pattern based on surrounding subsamples in a surrounding region of the pixel. Further, the GPU (130) determines, according to the lookup table (151), a blending vector associated with the surrounding subsample pattern for a location in the pixel. The blending vector includes blending weights for candidate subsamples of the pixel. The GPU (130) can calculate a value for an output pixel at the location based on a weighted sum of the candidate subsamples based on the blending weights for the subsamples. The GPU (130) can store calculated values of the output pixels for the higher resolution into the memory (143), such as an upscaled image (153) in FIG. 1.

It is noted that the surrounding subsample patterns (also referred to as search patterns in some examples) can be determined by any suitable techniques. In some examples, the surrounding subsample patterns are generated based on subsample differences, and referred to as subsample difference patterns.

Figure 3:
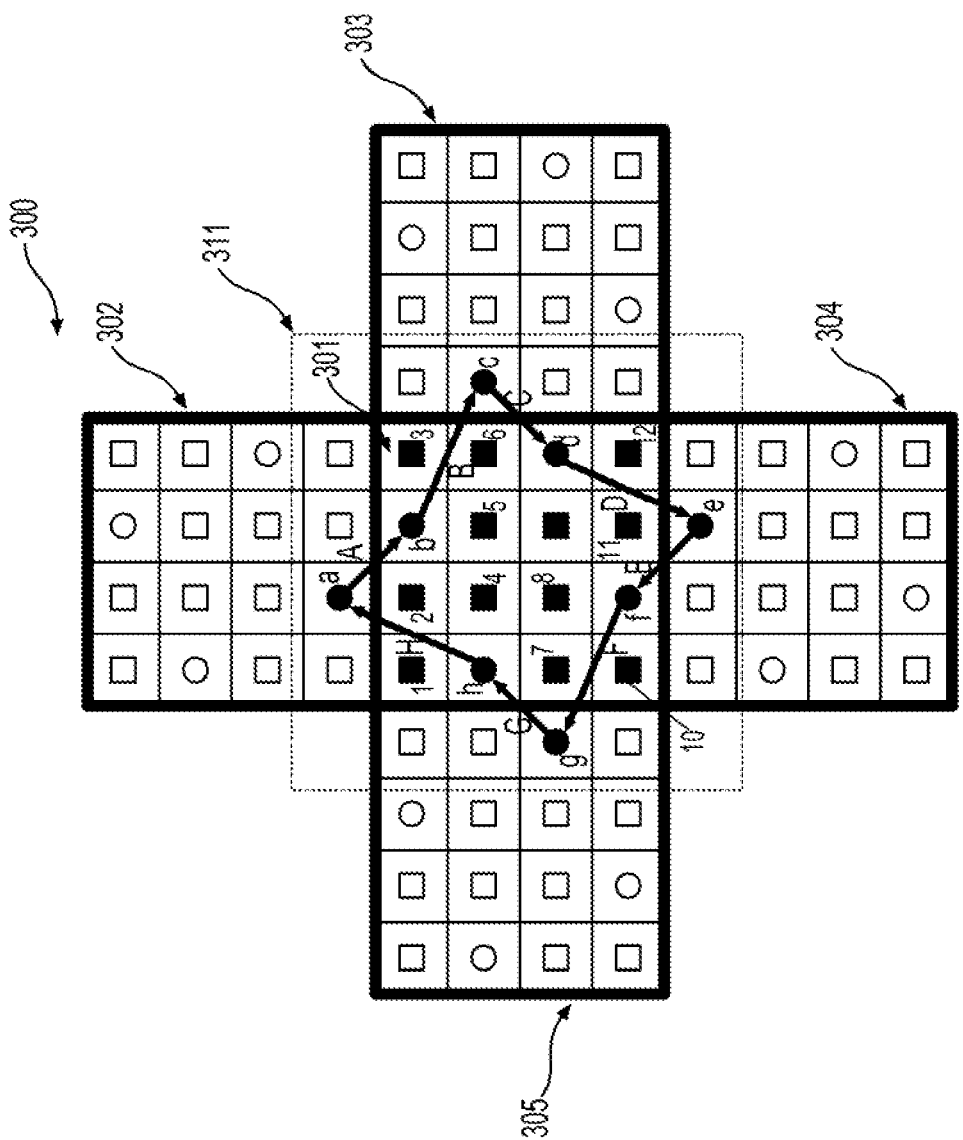
FIG. 3 shows a diagram illustrating a technique to determine a subsample difference pattern in some examples.

FIG. 3 shows a diagram (300) illustrating a technique to determine a subsample difference pattern in some examples. FIG. 3 shows a pixel (301) and four adjacent pixels (302)-(305) of the pixel (301) in an intended output image of rendering with regular MSAA. When the 4×RGSS sampling pattern is used, each of pixels (301)-(305) includes four subsamples (also referred to as fragments in some examples), such as shown by circles (including solid black circles and empty circles) in FIG. 3. It is noted that while the 4×RGSS sampling pattern is used in FIG. 3, other suitable sampling pattern can be used for MSAA. In FIG. 3, the small squares (including small solid black squares and small empty squares) represent locations without subsamples (also referred to as locations with missing subsamples). In some examples, the GPU (130) can reconstruct subsamples for the locations represented by the small solid black squares within the pixel (301) based on candidate subsamples, such as represented by solid black circles.

In some examples, for each pixel, such as the pixel (301), a sample difference pattern is generated according to surrounding subsamples. The surrounding subsamples can include subsamples in the pixel (301), and subsamples in neighboring pixels, such as the adjacent pixels (302)-(305). In the FIG. 3 examples, the sample difference pattern is generated based on eight subsamples (a)-(h) that are shown as solid black circles. In the FIG. 3 example, the sample difference pattern includes 8 bits, and each bit represents a comparing result of two subsamples in the eight subsamples. In an example, each bit of the 8-bit pattern is formed by comparing the color or luminance or depth of the nearby MSAA subsamples (also referred to as fragments in some examples). In FIG. 3, the 8-bit pattern includes bits A-H that each corresponds to an arrow in FIG. 3. Each bit X (X is one of bits A-H) can be calculated according to Eq. (1):

$$\text{Bit } X = \text{Diff}(\text{Subsample}(\text{ArrowStart}), \text{Subsample}(\text{ArrowEnd})) > \text{Threshold} ? 1 : 0 \qquad \text{Eq. (1)}$$

For example, for bit A, when the luminance difference of the subsample (a) at the start of the arrow to the subsample (b) at the end of the arrow is greater than a threshold, bit A is 1, and the luminance difference of the subsample (a) at the start of the arrow to the subsample (b) at the end of the arrow is equal or smaller than the threshold, bit A is 0.

It is noted that the surrounding subsample pattern can be formed by any number of subsamples, and can include any number of bits. In some examples, the number of bits (D) in the surrounding subsample pattern is determined based on dictionary size $2^D$ for fitting in a memory. For example, when D is 12, the dictionary size is 4096 for each location of missing subsamples and can corresponds to the number of blending weight vectors in a lookup table. It is also noted that any suitable comparing pattern can be used as long as the comparing pattern covers the pixel, such as the pixel (301), reasonably well.

According to some aspects of the disclosure, the upscaling based on MSAA is performed using a data-driven approach with a training process and a runtime upscaling process. The training process is performed by any suitable device, such as the electronic device (100), a server device, or any other device to determine the lookup table(s) before the runtime upscaling process for rendering higher resolution images. It is noted that the training process for the lookup table is prior to the runtime upscaling process, and does not affect the runtime resources, such as the memory usage, computation complexity, and the like, of runtime upscaling process, and the training process is referred to as pre-training process in some examples. After the electronic device (100) determines a lookup table, the electronic device (100) can store the lookup table in a file system of the electronic device (100. When the lookup table is generated by another device, the lookup table can be suitable transmitted to the electronic device (100) and stored in a file system at the electronic device (100). The lookup table in the file system of the electronic device (100) can be loaded in the memory (141) at a time for upscaling. In an example, the memory (141) is configured to have fast access speed for the GPU (130).

According to an aspect of the disclosure, the training process uses a high-resolution image rendered in the same camera setting as a low-resolution image output from rendering with regular MSAA, the high-resolution image is used as a reference image. In an example, the resolution of the reference image is 4× on each dimension as the low-resolution image in the case of 4×MSAA (four subsamples per pixel). In another example, the resolution of the reference image is 2× on each dimension as the low-resolution image in the case of 2× MSAA (2 subsamples per pixel). In some examples, MSAA uses RGSS sampling pattern and each subsample occupies a unique row and column. In an example, intended output image of regular MSAA is of the low-resolution, to generate a lookup table for use with of 4×MSAA, a reference image with four times of pixels on each dimension is generated. For example, when the low-resolution is 800×600, the reference image of 3200×2400 resolution is used in the case of 4×MSAA. The reference image can be generated by any suitable technique, such as rendering at the high resolution, such as 3200×2400 resolution.

During the training process, a rendering of the low-resolution image with MSAA is performed. Each pixel of the low-resolution image includes locations corresponding to pixels of the reference image. Some locations have available subsamples in the MSAA intermediate buffer, some locations have missing subsamples that are not available in the MSAA intermediate buffer. In some examples, for each location (represented by a small solid black square in FIG. 3) with missing subsample (also referred to as missing fragment) in a current pixel (301), a best matching subsample is determined from available MSAA subsamples (also referred to as MSAA fragments). The available MSAA subsamples are referred to as candidate subsamples in some examples. In some examples, the candidate subsamples include subsamples from the current pixel. For example, in the case of 4×MSAA, the candidate subsamples can be the four subsamples, such as subsamples (b), (d), (f) and (h) in the pixel (301). In some examples, the candidate subsamples include a same set of subsamples that are used to build the subsample difference pattern, so that no new subsamples need to be loaded. For example, in the FIG. 3 example, the candidate subsamples can be the 8 subsamples (a)-(h) that are shown in solid black circles.

Specifically, during the training process, for each location with a missing subsample, one of the candidate subsamples is determined to be the best matching candidate to the corresponding pixel in the reference image for the location. In an example, the best matching candidate has a least error to the corresponding pixel in the reference image. Then, a vote of the best marching candidate is collected and associated with the subsample difference pattern.

FIG. 4 shows a diagram (400) illustrating votes of best marching candidates in an example. The subsample difference pattern is determined according to the subsamples (a)-(h) as shown in FIG. 3, and the subsample difference pattern includes 8 bits. When 4×RGSS pattern is used in the MSAA, each current pixel includes 12 locations with missing subsamples that are numbered (1)-(12). The candidate subsamples include the same set of subsamples (a)-(h) to form the subsample difference pattern. Thus, for each location of missing subsample, there are 256 subsample difference patterns, and for each subsample difference pattern, 8 candidate subsamples can be voted. The total number of votes for each of the candidate subsamples can be collected for each location of missing subsample under each subsample difference pattern. In an example, for a location (e.g., shown by 1 in FIG. 3) of missing subsample in the pixel (301) of the low-resolution image, the subsample different pattern of the pixel (301) is determined to be "00000000", and then the candidate subsample (a) is determined to be the best matching candidate to a corresponding pixel of the reference image, then a vote is added to the number of votes for the candidate subsample (a) in FIG. 4, for example, the total votes of the candidate subsamples (a) can increase from 1 to 2 in FIG. 4.

In an example, in the case of using 8 bits as subsample difference patterns, there are 256 subsample difference patterns for the current pixel. When 4×RGSS pattern is used, there are 12 locations with missing subsamples, and the number of candidate samples is 8, then the storage for the entries to collect the votes can be: 256×12×8. In some examples, when N bits are used for the subsample different patterns, M is the number of MSAA samples, and C is the number of candidate samples, the maximum storage for entries to collect the votes can be calculated by $(2^N) \times M \times M \times C$. At each location of missing subsample, the best candidate subsample is found and a vote to one of the candidate subsamples can be added to a corresponding entry. In some examples, the final result of the collected votes can be normalized to get a C-length vector representing the blending weights for the candidate subsamples.

It is noted that the storage requirement for collecting the votes does not depend on resolution. In some examples, the results of the training process include a C-length vector associated for each location of missing subsample under each subsample difference pattern. It is noted that an available subsample in the MSAA can have a default C-length vector with a full weight on the subsample itself.

It is also noted that while in the above example, the training process is performed for the locations with missing subsamples, the training process can be performed for all the locations, including the locations with missing subsamples and the locations with available subsamples from the MSAA.

In some examples, the results of the training process can be suitably down-sampled. For example, the training results support upscaling to M times resolution, where M is the number of MSAA subsamples. For example, a rendering of 960×540 with 4×MSAA can be upscaled to 3840×2160 resolution based on the training results. However, in some examples, such high resolution output is not always desired. In an example, the blending weights, such as the C-length vectors, can be down-sampled.

Figure 5:
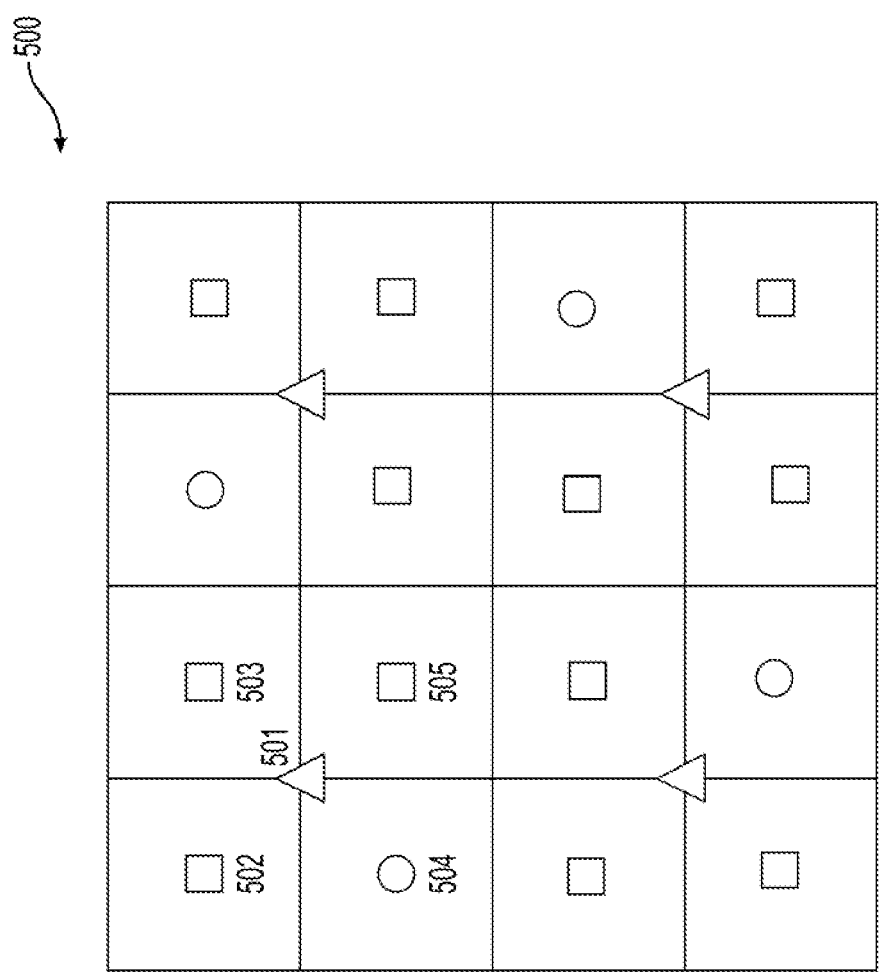
FIG. 5 shows a diagram of down-sampling of blending weights in some examples.

FIG. 5 shows a diagram of down sampling of blending weights in some examples. In FIG. 5, a pixel (500) in the low resolution includes four subsamples of 4×RGSS pattern from MSAA operation. The four subsamples are shown by circles. The pixel (500) includes 12 locations with missing subsamples that are shown by small squares. A training process can generate C-length vectors as blending weights for the missing subsamples. The C-length vectors can be used for 4×4 upscaling. In some examples, a 2×2 upscaling is desired. In some examples, the C-length vectors can be down sampled by 2×2 to generated down-sampled C-length vectors.

For example, to perform upscaling of 2×2, four output pixels need to be generated in the pixel (500), the positions of the four output pixels are shown by triangles. In some examples, a C-length vector associated with an output pixel is calculated by mixing the nearby C-vectors. For example, a C-length vector for an output pixel (501) can be calculated as an average of the C-length vectors for the subsamples (502), (503), (504) and (505). It is noted that the C-length vector for the output pixel (501) can be calculated by other suitable algorithm, such as more sophisticated algorithms. In the FIG. 5 example, the results of down sampling include C-length vectors for each of the four output pixels (shown by triangles) under each of the subsample difference patterns. The results of down sampled blending weights can be used to perform 2×2 upscaling. For example, using the down sampled blending weights, an input of 960×540 resolution with 4×MSAA can generate a resolution of 1920×1080.

In some examples, the training process is converged after matching with a plurality of reference images. In some examples, the C-length vectors can be compressed, then stored as data to be loaded for run-time use. In some examples, the C-length vectors can be down-sampled and compressed, then stored as data to be loaded for run-time use.

In some examples, the C-length vectors can be stored in the form of a lookup table. For example, the C-length vectors can be indexed according to subsample difference patterns and subsample locations. The lookup table includes the C-length vectors that are indexed according to subsample difference patterns and subsample locations. For example, according to a subsample difference pattern and a subsample location, an index is determined, and a C-length vector at the index can be output as the blending weights associated the subsample difference pattern and the subsample location.

In some examples, the C-length vectors can be organized in a plurality of lookup tables respectively associated with the subsample locations. A lookup table associated with a subsample location includes C-length vectors associated with subsample difference patterns. Each lookup table can be 2^N sized that includes 2^N C-length vectors associated with subsample difference patterns, N is the number of bits in each subsample difference pattern. The index of a C-length vector can be determined based on subsample difference pattern.

According to an aspect of the disclosure, during run-time upscaling process, one or more lookup tables are loaded, and a rendering of the low-resolution image with MSAA is performed. Multiple locations in each pixel of the low-resolution image can correspond to pixels of an upscaled image for output as the result of the run-time upscaling process. Some locations have available subsamples, for example, in the MSAA intermediate buffer, some locations have missing subsamples are not available by the rendering of the low-resolution image with MSAA. In some examples, for a current pixel (e.g., pixel (301)), a subsample difference pattern is constructed according to available subsamples in a surrounding region (such as a surrounding region (311) in FIG. 3) in the MSAA intermediate buffer. Then, an index is determined according to the subsample difference pattern. A lookup table associated with a location with missing subsample is searched according to the index to determine a C-length vector. The C-length vector includes blending weights for candidate subsamples in the MSAA intermediate buffer. Then, the missing subsample at the location is reconstructed according to the blending weights and the candidate subsamples in the MSAA intermediate buffer.

Figure 6:
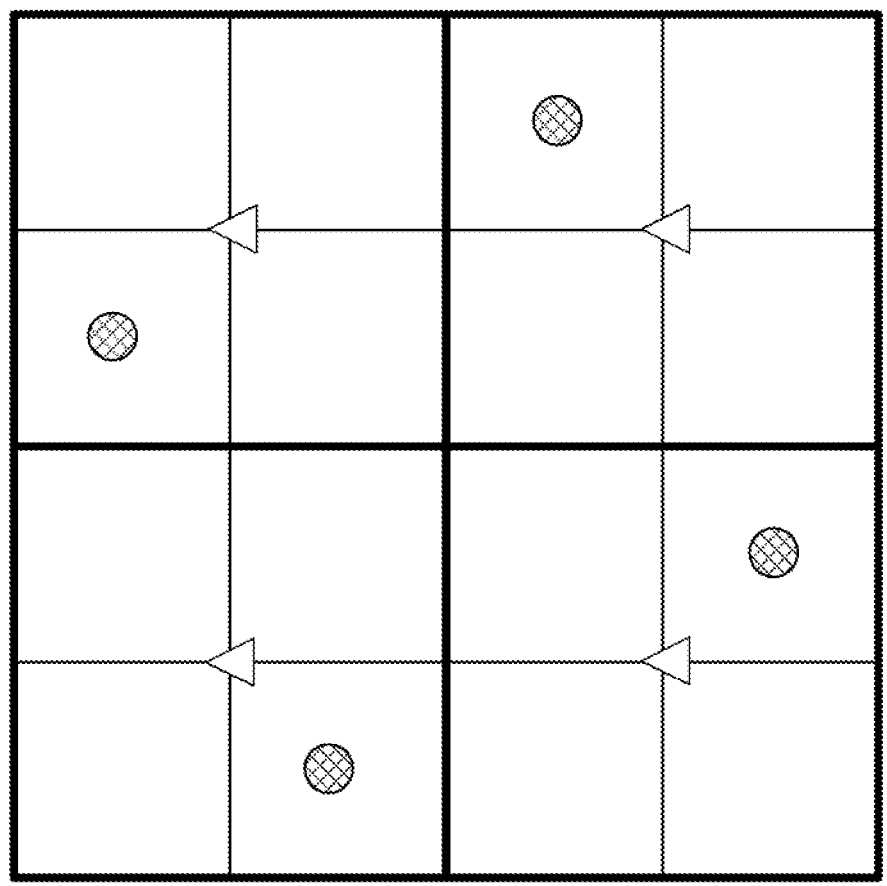
FIG. 6 shows a diagram illustrating run-time upscaling in some examples.

FIG. 6 shows a diagram illustrating run-time upscaling in some examples. FIG. 6 shows a pixel (600) of the low-resolution, and the pixel (600) is also referred to as upscaling work unit (600) in some examples. In FIG. 6, the upscaling work unit (600) includes 2×2 output pixels for the upscaled image. The 2×2 output pixels are represented by triangles in FIG. 6. In some examples, each output pixel has a unique (2^N) sized lookup table associated with the location of the output pixel, where N is the number of bits of subsample difference pattern. Each entry in the lookup table is a C-sized vector, where C is the number of candidate subsamples. It is noted that the candidate samples are not restricted to the current upscaling work unit, often some of the candidate subsamples are fetched outside of the current upscaling work unit.

In some examples, for a current upscaling work unit (600), N surrounding subsamples are fetched into an array of Subsamples[N], where N is the predefined number of bits. Based on the N surrounding subsamples, a subsample difference pattern (e.g., N bits) is calculated. The subsample difference pattern corresponds to an index of a lookup table associated with an output pixel location.

In some examples, for the current upscaling work unit (600), C candidate subsamples are fetched into array Subsamples[C] for blending calculations. It is noted that, in an example, the candidate subsamples can be the same as the surrounding subsamples for determining the subsample difference pattern, the fetching of the C candidate subsamples can be skipped. In some examples, the N surrounding subsamples include all the C candidate subsamples, unused subsamples can be just ignored. In some examples, the C candidate subsamples include additional subsamples to the N surrounding subsamples, thus the additional subsamples are fetched.

Further, in some examples, for each output pixel inside the upscaling work unit (600), a lookup table associated with the output pixel is located. The lookup table is searched according to the subsample difference pattern to find a C-sized vector associated with the subsample difference pattern in the lookup table. The C-sized vector indicates respective blending weights for the candidate subsamples. The Subsamples[C] are blended according to the blending weights indicated by the C-sized vector. The blending result is for the output pixel of upscaled image. In an example, the blending result is stored into the memory (143) at a memory space allocated to the output pixel of the upscaled image.

According to an aspect of the disclosure, the run-time upscaling process uses a rendering of low resolution with MSAA, lookup operations, multiplication and addition operations, and the run-time upscaling process can be performed by most GPUs with fast speed at run time.

According to an aspect of the disclosure, for rendering with regular MSAA, alpha-test is performed by default for covered subsamples within a pixel once, there's only one alpha output for all subsamples. The alpha-test results do not have a geometry edge, the regular rendering with MSAA does not naturally anti-alias alpha test objects. According to an aspect of the disclosure, a technique that is referred to as alpha to coverage can be used. The alpha to coverage can replace alpha blending value with a coverage mask. In an example, when multisampling is used, alpha to coverage can generate bits for subsamples in a pixel to indicate transparency of the subsamples.

According to some aspects of the disclosure, the MSAA based upscaling techniques can utilize the MSAA supported in most GPUs to efficiently obtain extra geometry edge information and use the extra geometry edge information for upscaling, at virtually no extra cost. The MSAA based upscaling techniques can use high-quality image to train blending weights offline, and use at run-time efficient computations, such as comparing, lookup and blending for upscaling. The MSAA based upscaling techniques can support up to N×N resolution upscaling factor, when using N×MSAA. The MSAA based upscaling techniques can support proper upscaling of alpha-test rendering. It is noted that the MSAA based upscaling does not need multi-frame input images (multi-image super resolution, MISR), thus can greatly reduce implementation and computation complexity, and allow efficient rendering even on low-powered mobile devices.

Figure 7:
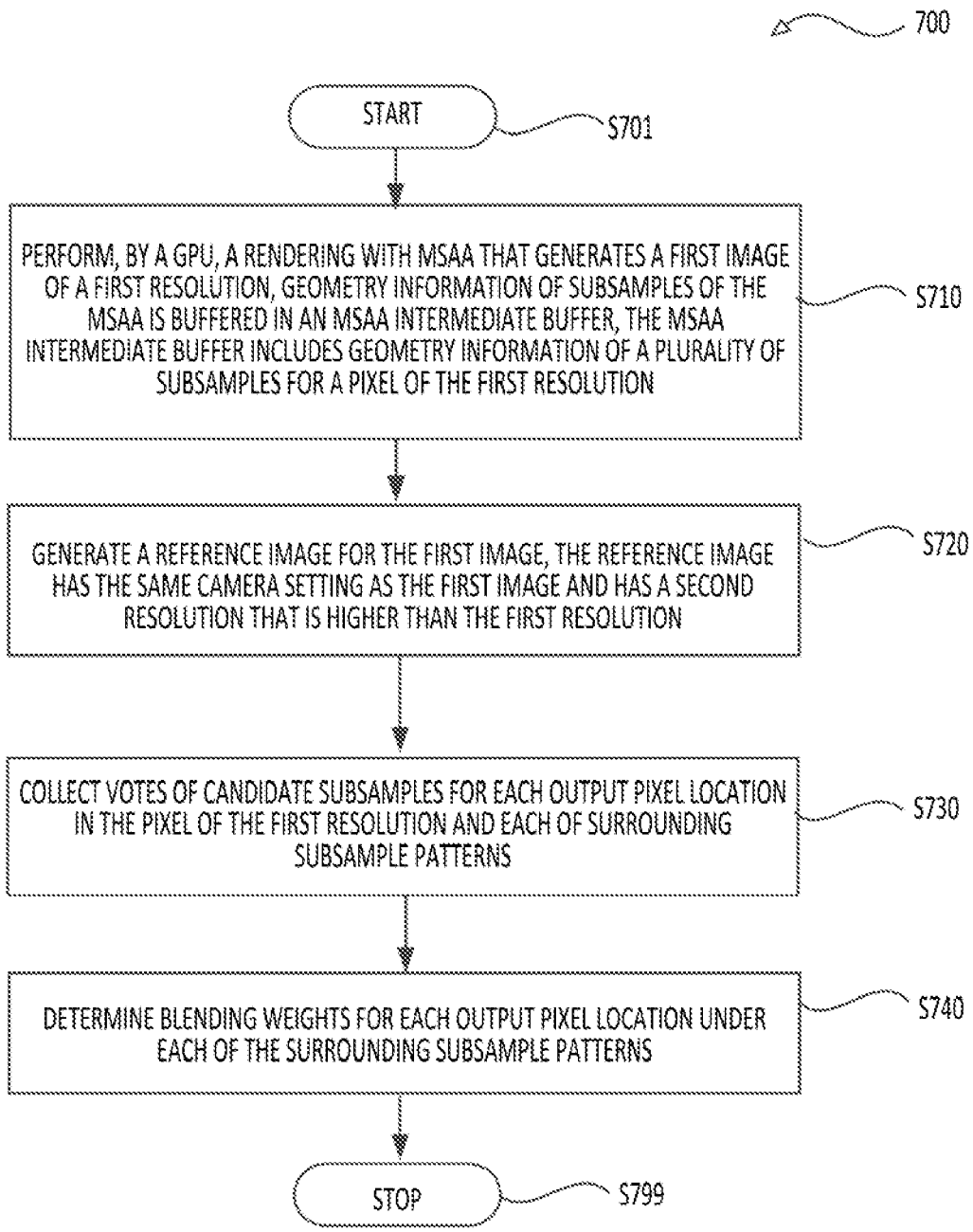
FIG. 7 shows a flow chart outlining a process according to an embodiment of the disclosure.

FIG. 7 shows a flow chart outlining a process (700) according to an embodiment of the disclosure. The process (700) is a training process. In some embodiments, the process (700) is implemented as software instructions, thus when processing circuitry (e.g., a GPU) executes the software instructions, the processing circuitry performs the process (700). The process starts at (S701) and proceeds to (S710).

At (S710), a rendering with MSAA that generates a first image of a first resolution is performed, geometry information of subsamples of the MSAA is buffered in an MSAA intermediate buffer, the MSAA intermediate buffer includes geometry information of a plurality of subsamples for a pixel of the first resolution.

At (S720), a reference image for the first image is generated. The reference image has the same camera setting as the first image and has a second resolution that is higher than the first resolution.

At (S730), votes of candidate subsamples for each of output pixel locations in the pixel of the first resolution are collected for each of surrounding subsample patterns based on the reference image and the MSAA intermediate buffer.

In some examples, for a first pixel of the first image, a first surrounding subsample pattern is determined based on first subsamples that are among the subsamples buffered in the MSAA intermediate buffer, the first subsamples are in a surrounding region of the first pixel. When a location in the first pixel has a corresponding pixel in the reference image, the location is referred to as an output pixel location. For an output pixel location, a candidate subsample from first candidate subsamples is selected, the first candidate subsamples are among the subsamples buffered in the MSAA intermediate buffer. The selected candidate subsample has a least error to the corresponding pixel in the reference image. Then, a vote is added to the determined candidate subsample associated with the first surrounding subsample pattern and the output pixel location.

In some examples, the votes are collected based on multiple images of the first resolution and their reference images of the second resolution than the first resolution.

At (S740), blending weights for each of the surrounding subsample patterns are determined for each of output pixel locations based on the collected votes. In some examples, the votes of the candidate subsamples associated with a surrounding subsample pattern and an output pixel location are normalized to form a blending weight vector of blending weights.

In some examples, the blending weights can be arranged into lookup tables associated with the output pixel locations, and can be used for upscaling to the second resolution. In some examples, the blending weights are down-sampled for down-sampled output pixel locations, and the down-sampled blending weights can be used for upscaling to a resolution lower than the second resolution and higher than the first resolution.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
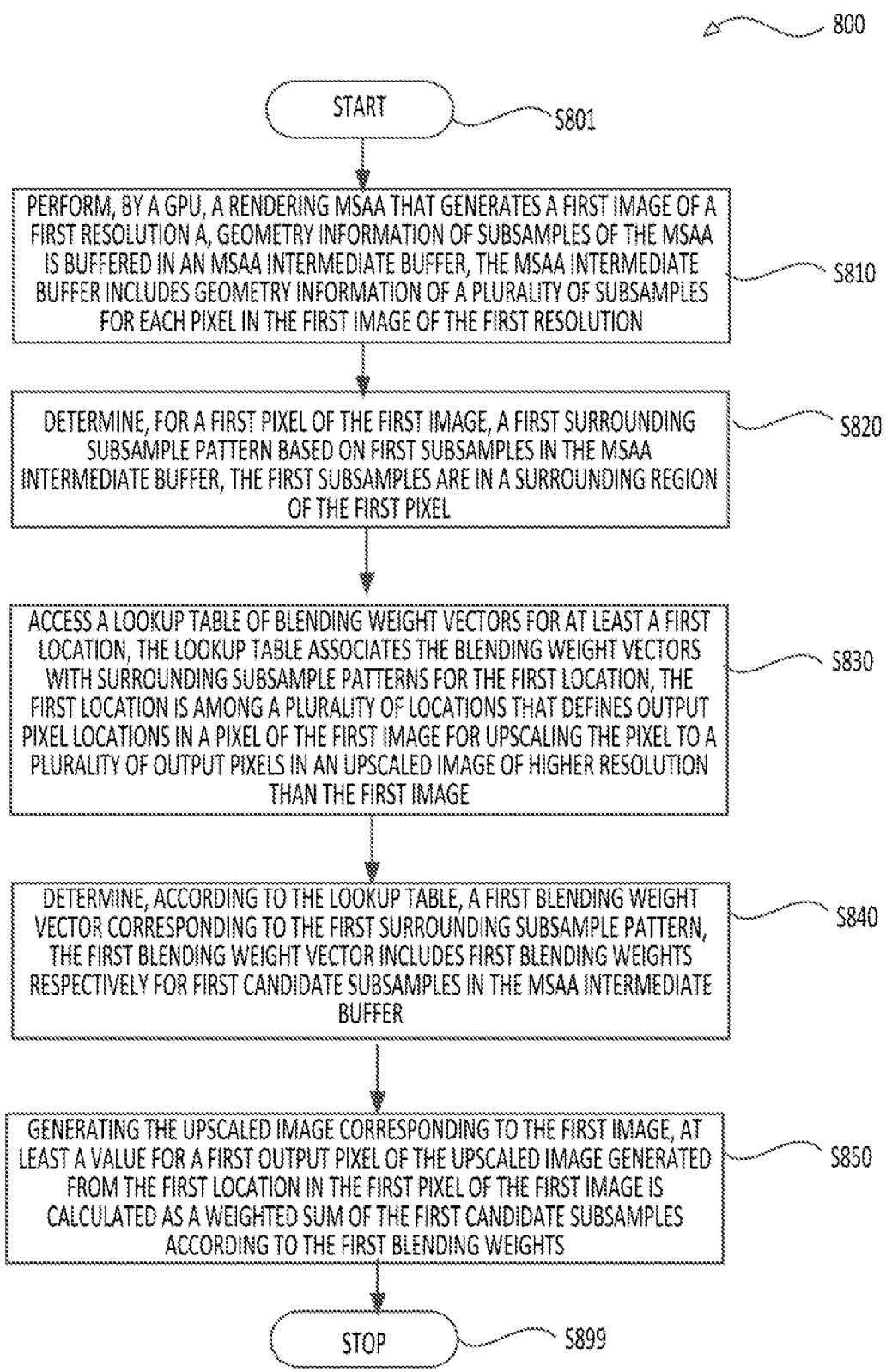
FIG. 8 shows a flow chart outlining a process according to some embodiments of the disclosure.

FIG. 8 shows a flow chart outlining a process (800) according to an embodiment of the disclosure. The process (800) is a run time upscaling process. In some embodiments, the process (800) is implemented as software instructions, thus when processing circuitry (e.g., a GPU) executes the software instructions, the processing circuitry performs the process (800). The process starts at (S801) and proceeds to (S810).

At (S810), a rendering with MSAA that generates a first image of a first resolution is performed. Geometry information of subsamples of the MSAA is buffered in an MSAA intermediate buffer, the MSAA intermediate buffer includes geometry information of a plurality of subsamples for each pixel in the first image of the first resolution.

At (S820), for a first pixel of the first image, a first surrounding subsample pattern is determined based on first subsamples that are among the subsamples buffered in the MSAA intermediate buffer, the first subsamples are in a surrounding region of the first pixel.

At (S830), a lookup table of blending weight vectors for at least a first location is accessed, for example loaded in the memory for access by a GPU. The lookup table associates the blending weight vectors with surrounding subsample patterns for the first location. In some examples, the blending weight vectors associated with the surrounding subsample patterns are pre-trained. The first location is among a plurality of locations that define output pixel locations in a pixel of the first image for upscaling the pixel to a plurality of output pixels in an upscaled image of higher resolution than the first image.

At (S840), according to the lookup table, a first blending weight vector corresponding to the first surrounding subsample pattern is determined. The first blending weight vector includes first blending weights respectively for first candidate subsamples in the MSAA intermediate buffer.

At (S850), the upscaled image corresponding to the first image is generated, at least a value for a first output pixel of the upscaled image generated from the first location in the first pixel of the first image is calculated as a weighted sum of the first candidate subsamples according to the first blending weights.

In some examples, the plurality of subsamples that are generated by the rendering with MSAA for the pixel of the first resolution have a rotated grid supersampling (RGSS) pattern. In an example, the rendering with MSAA generates four subsamples of 4×RGSS pattern for the pixel of the first resolution.

In some examples, the first subsamples in the surrounding region of the first pixel includes a plurality of subsamples in the first pixel. In some examples, the first subsamples in the surrounding region of the first pixel also include one or more subsamples in one or more adjacent pixels of the first pixel.

In some examples, the first surrounding subsample pattern is a subsample difference pattern. In an example, a difference between two subsamples in the first subsamples is calculated, and a bit in the first surrounding subsample pattern is determined based on the difference. In some examples, the difference can be a color difference, a luminance difference, or a depth difference.

In some examples, the first subsamples that are used to generate the first surrounding subsample pattern are of a same set of subsamples as the first candidate subsamples.

In some examples, the first subsamples that are used to generate the first surrounding subsample pattern include the first candidate subsamples.

In some examples, the first candidate subsamples include the first subsamples that are used to generate the first surrounding subsample pattern.

In some examples, the lookup table includes a set of blending weight vectors for at least the first location, an index of a blending weight vector in the lookup table is determined by a surrounding subsample pattern associated with the blending weight vector. The set of blending weight vectors for the first location can be pretrained.

Then, the process proceeds to (S899) and terminates.

The process (800) can be suitably adapted. Step(s) in the process (800) can be modified and/or omitted. Additional step(s) can be added. Any suitable order of implementation can be used.

Figure 9:
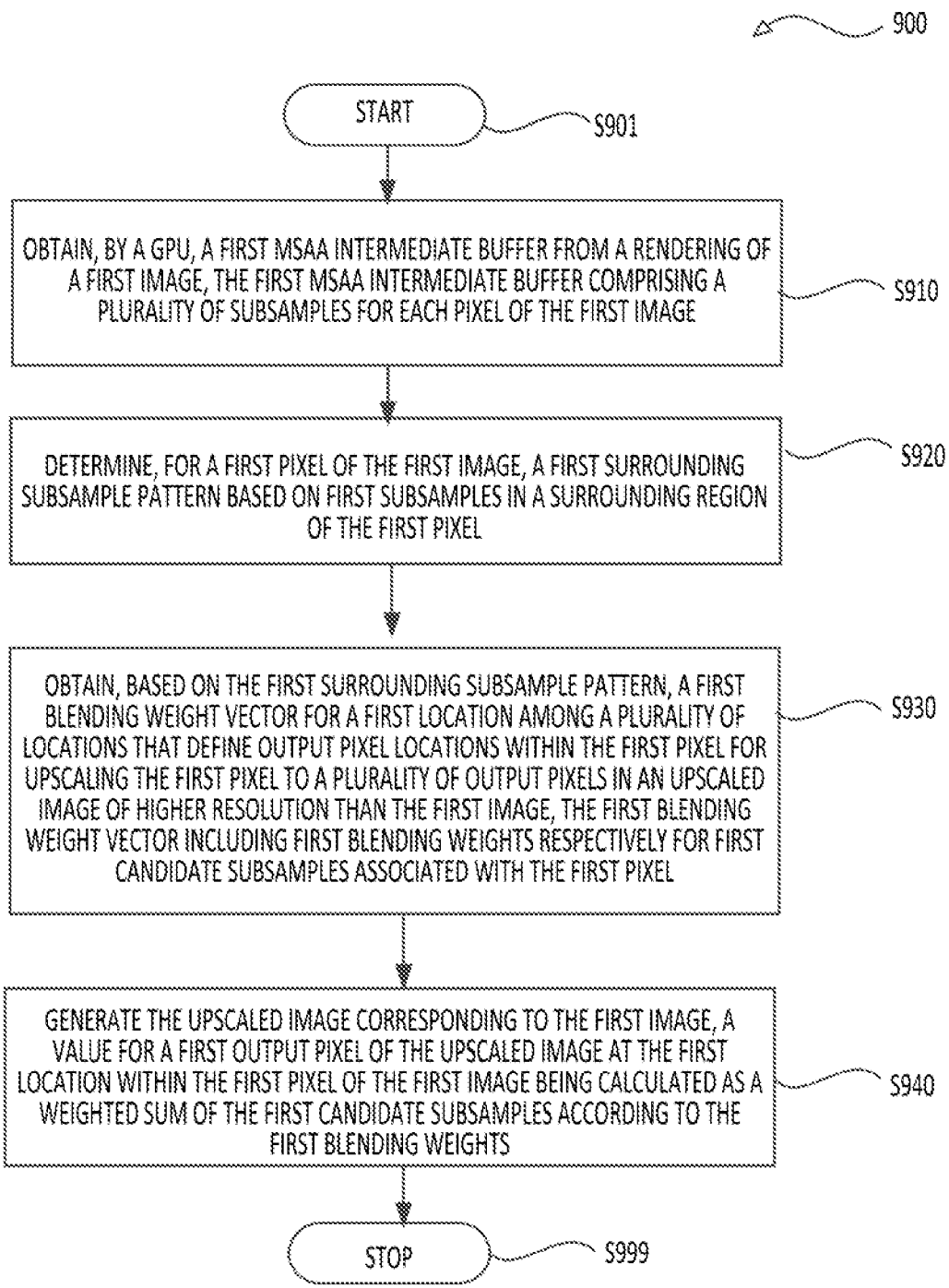
FIG. 9 shows a flow chart outlining a process according to some embodiments of the disclosure.

FIG. 9 shows a flow chart outlining a process (900) according to an embodiment of the disclosure. The process (900) is a run time upscaling process. In some embodiments, the process (900) is implemented as software instructions, thus when processing circuitry (e.g., a GPU) executes the software instructions, the processing circuitry performs the process (900). The process starts at (S901) and proceeds to (S910).

At (S910), a first multi-sample anti-aliasing (MSAA) intermediate buffer is obtained from a rendering of a first image, the first MSAA intermediate buffer includes a plurality of subsamples for each pixel of the first image.

At (S920), for a first pixel of the first image, a first surrounding subsample pattern is determined based on first subsamples in a surrounding region of the first pixel.

At (S930), based on the first surrounding subsample pattern, a first blending weight vector for a first location is obtained. The first location is among a plurality of locations that define output pixel locations within the first pixel for upscaling the first pixel to a plurality of output pixels in an upscaled image of higher resolution than the first image. The first blending weight vector includes first blending weights respectively for first candidate subsamples associated with the first pixel.

At (S940), the upscaled image corresponding to the first image is generated. A value for a first output pixel of the upscaled image generated from the first location within the first pixel of the first image is calculated as a weighted sum of the first candidate subsamples according to the first blending weights.

In some examples, the rendering of the first image generates for a pixel of the first image, a plurality of subsamples that have a rotated grip supersampling (RGSS) pattern. In an example, the rendering generates four subsamples of 4×RGSS pattern for the pixel of the first image.

In some examples, the first subsamples in the surrounding region of the first pixel comprises a plurality of subsamples in the first pixel and one or more subsamples in one or more adjacent pixels of the first pixel.

In some examples, the first surrounding subsample pattern is a subsample difference pattern. To determine the first surrounding subsample pattern, in an example, a difference between two subsamples in the first subsamples is determined, and a bit in the first surrounding subsample pattern is determined based on the difference. The difference is at least one of a color difference, a luminance difference, and a depth difference.

In some examples, the first subsamples that are used to generate the first surrounding subsample pattern are of a same set of subsamples as the first candidate subsamples.

In some examples, the first subsamples that are used to generate the first surrounding subsample pattern include the first candidate subsamples.

In some examples, the first candidate subsamples include the first subsamples that are used to generate the first surrounding subsample pattern.

In some examples, to obtain the first blending weight vector, an index to a lookup table is determined according to the first surrounding subsample pattern, the lookup table includes a set of blending weight vectors that are indexed according to surrounding subsample patterns.

Then, the process proceeds to (S999) and terminates.

The process (900) can be suitably adapted. Step(s) in the process (900) can be modified and/or omitted. Additional step(s) can be added. Any suitable order of implementation can be used.

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
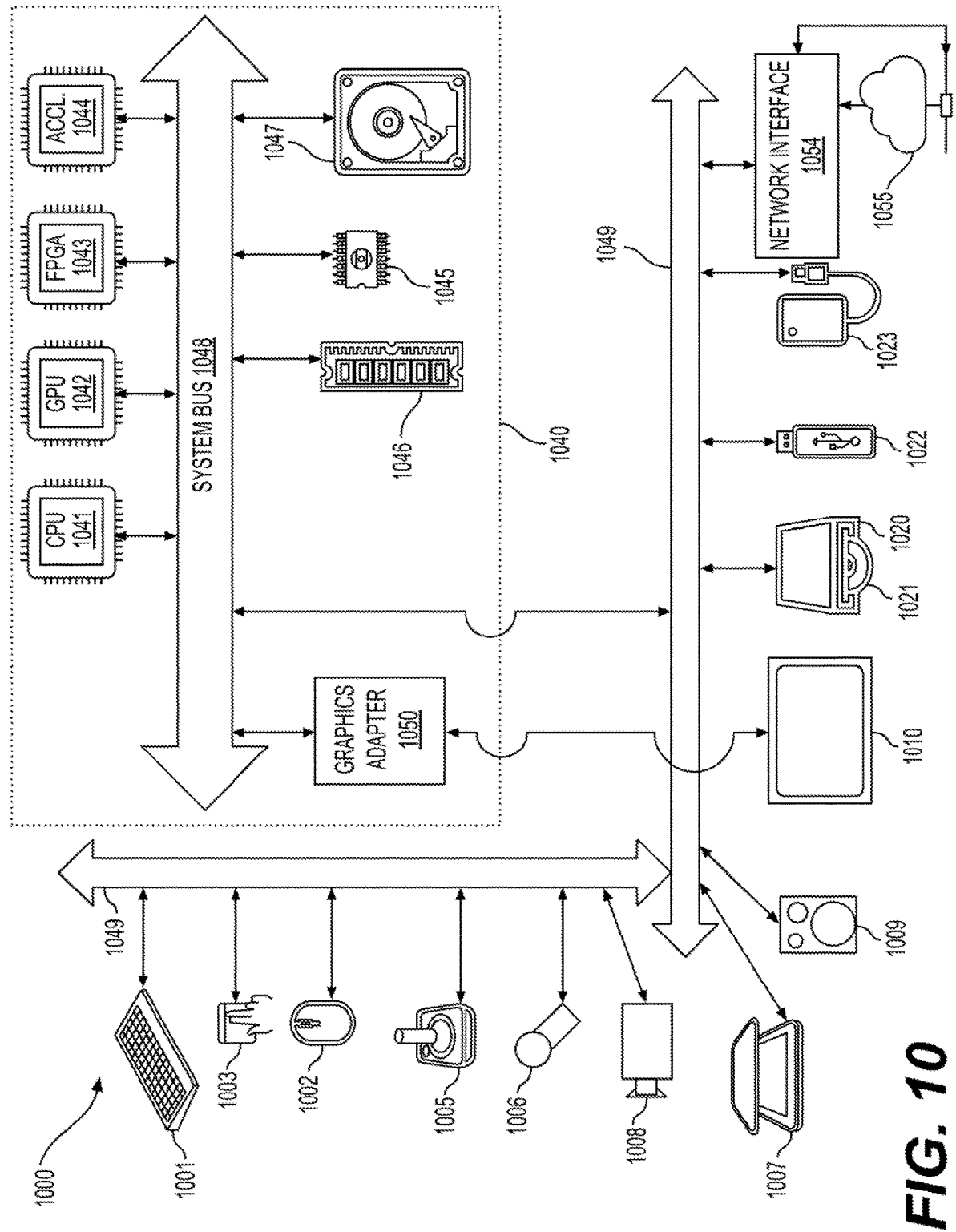
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for image rendering in an electronic device, comprising:
    obtaining, by a graphics processing unit (GPU), a first multi-sample anti-aliasing (MSAA) intermediate buffer from a rendering of a first image, the first MSAA intermediate buffer comprising a plurality of subsamples for each pixel of the first image;
    determining, for a first pixel of the first image, a first subsample geometry pattern based on first subsamples in a surrounding region of the first pixel, the first subsample geometry pattern being generated based on differences between values of subsamples in the surrounding region of the first pixel;
    obtaining, based on a lookup table, a first blending weight vector for a first location within the first pixel that is associated with the first subsample pattern in the lookup table, the first location being among a plurality of locations that define output pixel locations within the first pixel for upscaling the first pixel to a plurality of output pixels in an upscaled image of higher resolution than the first image, the first blending weight vector including first blending weights respectively for first candidate subsamples associated with the first pixel, the lookup table comprising a set of blending weight vectors that are associated with respective subsample geometry patterns; and
    generating the upscaled image corresponding to the first image, a value for a first output pixel of the upscaled image at the first location within the first pixel of the first image being calculated as a weighted sum of the first candidate subsamples according to the first blending weights.

2. The method of claim 1, wherein the rendering of the first image generates for a pixel of the first image, a plurality of subsamples that have a rotated grid supersampling (RGSS) pattern.

3. The method of claim 2, wherein the rendering of the first image generates four subsamples of 4×RGSS pattern for the pixel of the first image.

4. The method of claim 1, wherein the first subsamples in the surrounding region of the first pixel comprises a plurality of subsamples in the first pixel.

5. The method of claim 4, wherein the first subsamples in the surrounding region of the first pixel comprises one or more subsamples in one or more adjacent pixels of the first pixel.

6. The method of claim 1, wherein the first subsample geometry pattern is a subsample difference pattern, and the determining the first subsample geometry pattern further comprises:
    determining a difference between two subsamples in the first subsamples; and
    determining a bit in the first subsample geometry pattern based on the difference.

7. The method of claim 6, wherein the difference is at least one of a color difference, a luminance difference, and a depth difference.

8. The method of claim 1, wherein the first subsamples that are used to generate the first surrounding subsample pattern are of a same set of subsamples as the first candidate subsamples.

9. The method of claim 1, wherein the first subsamples that are used to generate the first surrounding subsample pattern include the first candidate subsamples.

10. The method of claim 1, wherein the first candidate subsamples include the first subsamples that are used to generate the first subsample geometry pattern.

11. The method of claim 1, further comprising:
    pre-training the set of blending weight vectors for the subsample geometry patterns by using at least a reference image of a resolution that is equal to or higher than the upscaled image.

12. The method of claim 11, wherein the pre-training the set of blending weight vectors comprises:
    obtaining a second MSAA intermediate buffer from a rendering of a second image having a same camera setting as the reference image, the second image having a same resolution as the first image;
    collecting votes of candidate subsamples for a subsample geometry pattern based on the second MSAA intermediate buffer and the reference image; and
    determining blending weights in a blending weight vector associated with the subsample geometry pattern according to the votes of the candidate subsamples.

13. The method of claim 12, wherein the collecting the votes of the candidate subsamples comprises:
    for a location in a pixel of the second image that has a corresponding pixel in the reference image,
    determining, from the candidate subsamples, a first candidate subsample that has a least error to the corresponding pixel in the reference image; and
    adding a vote to the first candidate subsample.

14. An electronic device, comprising processing circuitry configured to:
    obtain a first multi-sample anti-aliasing (MSAA) intermediate buffer from a rendering of a first image, the first MSAA intermediate buffer comprising a plurality of subsamples for each pixel of the first image;
    determine, for a first pixel of the first image, a first subsample geometry pattern based on first subsamples in a surrounding region of the first pixel, the subsample geometry pattern being generated based on differences between values of the first subsamples;
    obtain, based on a lookup table, a first blending weight vector for a first location within the first pixel that is associated with the first subsample pattern in the lookup table, the first location being among a plurality of locations that define output pixel locations within the first pixel for upscaling the first pixel to a plurality of output pixels in an upscaled image of higher resolution than the first image, the first blending weight vector including first blending weights respectively for first candidate subsamples associated with the first pixel, the lookup table comprising a set of blending weight vectors that are associated with respective subsample geometry patterns; and generate the upscaled image corresponding to the first image, a value for a first output pixel of the upscaled image at the first location within the first pixel of the first image being calculated as a weighted sum of the first candidate subsamples according to the first blending weights.

15. The electronic device of claim 14, wherein the rendering of the first image generates, for a pixel of the first image, a plurality of subsamples that have a rotated grid supersampling (RGSS) pattern.

16. The electronic device of claim 15, wherein the rendering of the first image generates four subsamples of 4×RGSS pattern for the pixel of the first image.

17. The electronic device of claim 14, wherein the first subsamples in the surrounding region of the first pixel comprise a plurality of subsamples in the first pixel and one or more subsamples in one or more adjacent pixels of the first pixel.

18. The electronic device of claim 14, wherein the first subsample geometry pattern is a subsample difference pattern, and the processing circuitry is configured to:

determine a difference between two subsamples in the first subsamples; and determine a bit in the first subsample geometry pattern based on the difference.

* * * * *